Patented June 18, 1929.

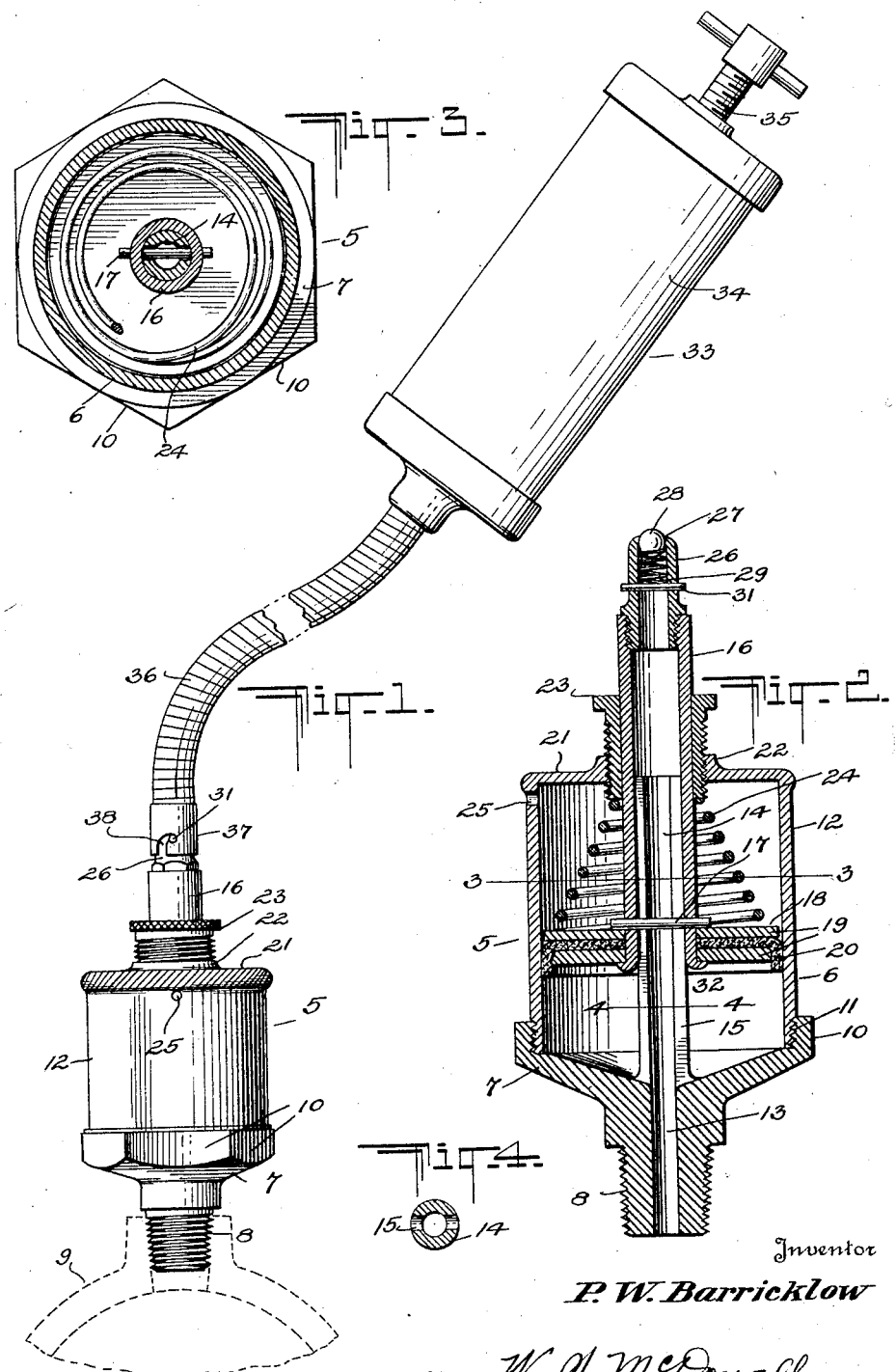

1,717,543

UNITED STATES PATENT OFFICE.

PAUL W. BARRICKLOW, OF COLUMBUS, OHIO.

GREASE CUP.

Application filed November 7, 1925. Serial No. 67,647.

This invention relates to improvements in grease-cups and is particularly directed to the provision of a grease-cup embodying means operable to effect the forcible expulsion of the grease or other lubricant therefrom, in order that there may be a sustained, slow feeding of the lubricant from the cup to meet the continued needs of an associated bearing or bearings.

In accordance with the invention there is provided a grease-cup consisting of a body provided with an outlet, and within the body there is disposed a slidable spring pressed piston operating to force the lubricant through the outlet, means being provided in conjunction with the body for admitting of the introduction of a lubricant therein by means of pressure so that the lubricant introduced into the cup will serve to place the spring proper, or other equivalent pressure agent, under tension.

It is a principal object of the invention to provide a grease-cup embodying a spring pressed plunger working in a reservoir or magazine provided with a restricted outlet, and in the provision of novel means by which the oil or other lubricant is introduced into the reservoir or magazine in such a manner that after the needs of an associated bearing have been met with, the lubricant introduced into the magazine will act to compress the plunger spring so that after the pressure of the device has been removed from the cup, a forced or stored energy will be provided to expel the lubricant from the magazine by a continuous slow feeding operation.

It is a common practice to lubricate motor vehicle bearings particularly by the provision of means for forcing the lubricant under very considerable pressure into and through the bearings, such devices being commonly termed "grease guns" and comprise a cylindrical barrel provided with a piston which is preferably screw operated for the purpose of advancing the lubricant on the far side of the piston toward an outlet, the latter being provided with a quick fastening means by which the barrel is detachably connected with a check valve fitting provided in connection with the bearing to be lubricated. These devices serve admirably to provide a positive advance of the grease into and through the bearing and provide a considerable improvement over the usual form of hand operated grease-cup, in that the process of lubricating a bearing is facilitated and a greater pressure supplied for forcing the lubricant into the bearing and expelling foreign clogging matter. It has been found, however, that while the system of lubrication is effective at the time it is used never-the-less it is not completely satisfactory in that the bearing quickly loses the lubricant supplied thereto and unless the bearing is supplied at frequent intervals with a freshly injected lubricant, an inefficient condition obtains.

Therefore, the present invention provides a grease-cup adapted for use in conjunction with a pressure lubricating system so that a bearing will be continually supplied with a clear fresh lubricant to an extent necessary to meet the working requirements of the bearing for a comparatively long period of time, avoiding the necessity, hitherto present, of lubricating the bearing at frequent intervals.

A further object of the invention rests in the provision of means by which the amount of lubricant supplied to each bearing from an associated grease-cup may be readily controlled in accordance with the actual demands of the bearing, and another object resides in constructing the grease-cup with indicating means of an extraneous character by which the amount of lubricant contained within the reservoir or magazine of the cup may be denoted from an exterior position.

A still further object rests in introducing a lubricant into the cup through an axially disposed passage by which the lubricant entrance to the cup is rendered accessible for connection with an associated grease gun.

For a further understanding of the invention reference is to be had to the following description and the accompanying drawing, wherein has been shown one of the preferred forms of the invention, and in which:

Figure 1 is a side elevation of a grease cup formed in accordance with the present invention and illustrating in connection therewith a device by which the cup is filled with a lubricant by pressure injection, Figure 2 is a vertical sectional view taken through the grease cup, Figure 3 is a horizontal section on the line 3—3 of Figure 2, Figure 4 is a similar view on the line 4—4 of Figure 2.

Referring more particularly to the drawing the numeral 5 designates the improved grease-cup comprising the present invention in its entirety. As shown, the cup consists of a hollow body 6 formed to include a base 7 having a reduced threaded lower end 8 for insertion into a correspondingly formed opening provided in the bearing 9 or other part to be lubricated. Above its lower end 8 the base 7 is considerably enlarged and is provided with polygonal exterior surfaces 10 permitting of the application of a wrench or the like so as to facilitate the tightening of a cup into its receiving opening within the bearing 9, or the removal of a cup from said opening. Interiorly the upper end of the base 7 is threaded as at 11 in order to accommodate the lower threaded end of an inverted cup shaped casing 12. Axially the base 7 is provided with a lubricant outlet 13 preferably in open communication with the bearing 9, and, this instance, the base is provided with an upwardly extending axially arranged tube 14, which is vertically slotted as at 15.

Slidably mounted on the tube 14 is a filling sleeve 16 which is connected with the tube 14 by means of a transversely disposed pin 17. This pin passes through the slots in the tube, as indicated in Figure 2, so as to limit the movement of the sleeve in an axial longitudinal direction, and also to prevent the sleeve from rotating axially about the tube, for the purpose to be hereinafter specified. The lower end of the sleeve 16 has fixed thereto a plunger 18, which in this instance consists of a pair of metallic disks 19 suitably held against longitudinal movement on the lower end of the sleeve and between which disks is clamped a leather or other flexible washer 20, having the peripheral edge thereof turned downwardly to extend parallel with the walls of the casing 12 so as to provide a packing preventing the passage of the lubricant past the plunger.

The top 21 of the casing 12 is provided with a centrally disposed boss 22, interiorly threaded for the reception of a threaded gland nut 23 in which is slidably positioned the sleeve 16. The lower end of the nut 23 projects into the casing and provides a seat for the upper end of a coil compression spring 24 having the convolutions thereof arranged in conic form. The lower end of this spring engages the top of the plunger 18 so that the normal tendency of the spring is to force the plunger downwardly in order that the lubricant contained within the cup 5 may be forced toward the outlet 13 and into the bearing. It is obvious that by turning the nut 23 the tension on the spring 24 may be varied so as to regulate the flow of the lubricant from the cup in accordance with the demands of each particular bearing with which one or more of the cups may be associated. A vent 25 is preferably provided in the casing 12 so as to release air pressure above the piston.

To introduce a lubricant into the cup, the upper end of the sleeve 16 is threaded for the reception of a check valve fitting 26. This fitting consists of a casing having a restricted inlet 27, that in this instance is normally closed by a ball 28 pressed by a spring 29, the spring being confined between the ball and a transverse pin 31 projecting through the fitting. This fitting is of hollow form so as to be in open communication with the upper end of the sleeve 16.

In operation, it will be seen that a lubricant, either grease or oil, may be inserted in the cup by the positive forcing of the lubricant past the check valve 28, through the sleeve 16 and the slots 15 in the tube 14 so that the lubricant will enter the reservoir or magazine 32 provided in the cup below the piston. This is preferably accomplished by means of a grease gun or other similar pressure device 33. In the specific form illustrated the grease gun comprises a casing 34 provided with an operating screw 35, which upon being manually rotated advances a plunger (not shown) within the casing 34 so as to push the lubricant through the flexible outlet hose 36 of the device into the entrance end of the grease cup. The hose 36 is provided with the usual attaching fitting 37, that is slotted as at 38 for the reception of the protruding ends of the pin 31. It will be seen that by rotating the screw 35, when the grease gun is attached as shown in Figure 1, the grease will be postively advanced through the hose 36, the fitting 26, the sleeve 16 and the tube 14 so as to fill the magazine 32 and at the same time supply the bearing 9 with an adequate quantity of the lubricant. As this occurs the lubricant is forced into the reservoir or magazine 32 so as to force the plunger in an upward direction and compresses a spring 24 whereby after the grease gun has been removed and the check valve 28 closed, the spring 24 will act to exercise a force on the plunger 18 which serves to provide a slow, continued and positive advance of the lubricant in the cup to the bearing 9, thus enabling the said bearing to be continuously supplied with said lubricant after the pressure gun has been removed and the pressure gun need not again be employed until after the full quantity of the lubricant has been expired from the magazine of the cup. The quantity of lubricant contained within the cup may be exteriorly noted by comparing the relative positions between the upper end of the fitting 26 and the casing 12. It will be observed that the sleeve 16 is prevented from rotating axially by the provision of the tube 14 and its associated pin 17 which is done in order to facilitate the connecting of the assocaited fittings 26 and 37. Moreover, by positioning the filling entrance of the cup in the axial location shown convenience is obtained by the accessible position of the fitting 26. Also, by the provision of the nut 23 the operative tension of the spring 24 may be varied for each particular bearing.

While I have described the present invention in a single specific embodiment, it is obvious that the said invention is not limited to the specific construction hereinbefore related, except in so far as such limitations are contained in the following claim.

What is claimed is:

A lubricant cup comprising a hollow body having an outlet, a slidable plunger in said body, a spring acting on said plunger to force the lubricant in said body through said outlet, a fixed slotted guide projecting inwardly from said body, a hollow stem on the plunger operating on said guide, a pin fixed in the hollow stem and passing through the slot in the guide to prevent axial rotation of said stem, and a check valve provided in the outer end of said stem for the admission of the lubricant to the hollow body through said stem and guide.

In testimony whereof I affix my signature.

PAUL W. BARRICKLOW.